June 24, 1958     H. B. HASSEL     2,840,402
TELESCOPIC LOCK
Filed Oct. 31, 1955
FIG. 1.
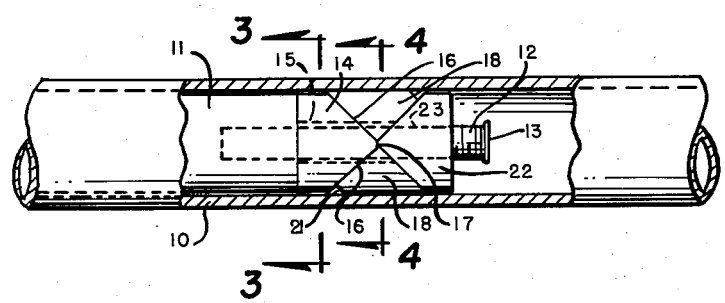
FIG. 2.
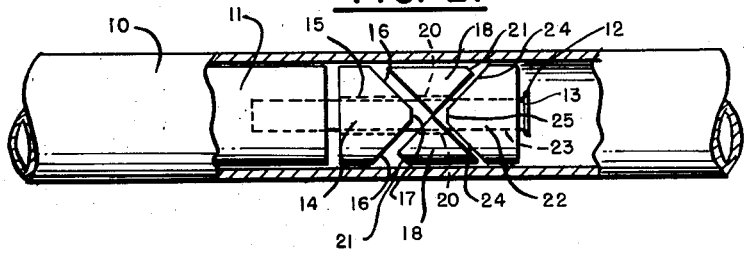
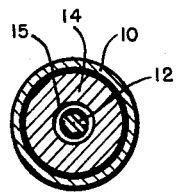
FIG. 3.
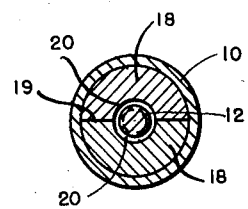
FIG. 4.
INVENTOR
HENRIK B. HASSEL

United States Patent Office 2,840,402
Patented June 24, 1958

2,840,402
TELESCOPIC LOCK

Henrik B. Hassel, Boyd, Minn.

Application October 31, 1955, Serial No. 543,722

4 Claims. (Cl. 287—58)

This invention has relation to a lock for fixedly positioning two telescopically related tubes with respect to each other. The invention will find use wherever a shaft is needed which can be fixed in longitudinal dimension when that is desired but which can be adjusted to another fixed longitudinal dimension when that is desired. For example, the invention can be incorporated into the legs of a table to make the table adjustable as to height.

A telescopic lock made according to the invention includes first and second tubular members which are telescopically related to each other. A threaded stud extends outwardly from the interior tubular member to position inside of the exterior tubular member, and a first frusto-cyclindrical member is loosely threadably mounted on said stud. Second and third frusto-cylindrical members are provided between camming surfaces of said first frusto-cylindrical member and similar camming surfaces provided on a fourth frusto-cylindrical member adjacent the end of said interior tubular member. When the interior tubular member is rotated with respect to the exterior tubular member, the first frusto-cylindrical member tends to stay with the outer member as far as rotative movement is concerned. Consequently, the first member will either be drawn toward or away from the end of the interior member under the action of the threads on the stud. The direction of movement depends on the hand of the threads and the direction of the relative rotation between the tubular members. As the first frusto-cylindrical member is drawn toward the end of the interior member, the camming surfaces of the first frustocylindrical member will come into contact with first camming surfaces of the second and third frusto-cylindrical members and will cause second camming surfaces of said members to come into contact with the camming surfaces on the fourth frusto-cylindrical member. When this happens, further rotation of the tubular members with respect to each other will cause the camming surfaces to force the second and third frusto-cylindrical surfaces outwardly against the inner surface of said exterior tubular member, thus to lock the exterior and interior tubular members firmly together in fixed angular and longitudinal relationship to each other.

By reversing the direction of rotation of the tubular members with respect to each other, the first frusto-cylindrical member can be moved in direction away from the inner member and the tubular members will become unlocked with respect to each other.

For other objects and for a better understanding of the invention, reference may be had to the following detailed description taken in connection with the accompanying drawing, in which:

Figure 1 is a side elevational view shown partly in section of a preferred embodiment of the present invention and showing the assembly in a locking position;

Fig. 2 is a view similar to Fig. 1 but showing the locking assembly in the unlocked position;

Fig. 3 is a transverse sectional view taken along the line 3—3 of Fig. 1; and

Fig. 4 is a transverse sectional view taken along the line 4—4 of Fig. 1.

Referring now more in detail to the drawing, 10 represents a tubular member which telescopically receives therewithin one end of a second tubular member 11, substantially as illustrated.

In the practice of my invention, means are provided for locking the tubular members 10 and 11 longitudinally with respect to each other and includes the externally threaded stud 12 which extends from, and is secured in suitable manner to the inner end of the tube 11, the end of the stud 12 remote from tube 11 being enlarged, as at 13.

A frusto-cylindrical member 14 is slidably situated within the tube 10 and has a smooth center bore 15 through which extends the stud 12. The member 14 is provided with oppositely disposed flat surfaces 16 which lie in intersecting planes which, as shown, are disposed at angles of 45 degrees to the sides of the tube 10. A flat end portion 17 is provided on the member 14 at an end thereof adjacent the intersection of the planes of the surfaces 16. This angle of 45 degrees has been found to be suitable for use in devices made according to the present invention which embody telescoping aluminum tubes in which the outer diameter of the interior tube and the inner diameter of the exterior tube approximate from one half to three eighths of an inch. Other angles may work equally well, however. For example, for larger tubes than specified above or for materials having different friction coefficients, the member 14 can be so constructed that the angle between the surfaces 16 and the sides of the tube 10 will be less than 45 degrees.

A pair of oppositely disposed frusto-cylindrical members 18 are provided with inner flat faces 19 which are cut away to provide semi-cylindrical smooth bores 20 which lie in clearing relation to the stud 12. As shown, these inner flat faces 19 are disposed at 45 degrees to the sides of the tube 10. In the event that the flat surfaces 16 of the frusto-cylindrical member 14 are constructed to lie at angles of other than 45 degrees to the sides of the tube 10, the angle between the surfaces 19 and said sides of the tube must be constructed to be at the same angle as between the surfaces 16 and said sides.

The assembly is completed by a fourth frusto-cylindrical member 22 identical in size and shape with the member 14 but which is provided with an internally threaded bore 23 through which is screwed the stud 12. The enlarged end 13 will prevent the displacement of the member 22 off of stud 12.

The member 22 is provided with surfaces 24 disposed in intersecting relationship to each other at angles shown herein to be angles of 45 degrees to the sides of the tube 10. A flat end portion 25 is provided adjacent the end 22 where the planes of the surfaces intersect.

In operation, when it is desired to lock the tube 11 angularly and longitudinally with respect to the tube 10, it is only necessary to rotate the tube 11 to rotate therewith the stud 12. The rotational movement of the stud 12 draws the internally threaded member 22 toward the end of the tube 11 and forces the surfaces 24 thereof against surfaces 19 of the second and third frusto-cylindrical members 18. Opposite surfaces 19 of these members will be forced, in turn, against the surfaces 16 of the frusto-cylindrical member 14. After these camming surfaces 16, 19 and 24 are all in contact with each other, further rotation of the tube 10 with respect to the tube 11 will cause the second and third frusto-cylindrical members 18 to be moved radially outwardly from the stud 12 thus to wedge themselves against the inner surface of the tube 10. Necessary longitudinal movement of the member 22 toward member 14 is possible until the flat surface 24 comes in contact with the flat surface 17, As an alternate construction, the supporting stud 12 may be pinned or otherwise permanently secured to the frusto-cylindrical member 22. In this case the opposite end of the stud 12 would be threadably mounted in the end of the tube 11.

While various changes may be made in the detail construction, it shall be understood that such changes shall be within the spirit and scope of the present invention as defined by the appended claims.

What I claim as new and desire to protect by Letters Patent of the United States is:

1. A telescopic lock including an exterior tube, an interior tube telescopically situated with respect to said exterior tube, a stud concentric with and fixedly mounted in a first end of said interior tube to have position inside said exterior tube, a first camming member threadably and rotatably mounted on said stud inside of said exterior tube, a second camming member slidably situated in said exterior tube around said stud and between said first end of said interior tube and said first camming member, third and fourth camming members each situated between said stud and an inner surface of a wall of said exterior tube and between said first and second camming members, each of said four camming members being provided with a pair of flat camming surfaces lying in planes which intersect at a line normal to the tubes axis and passing inside said wall of said exterior tube, and each of said pair of surfaces of each camming member lying in sliding, adjacent, contiguous camming relationship to a corresponding surface of an adjacent camming member.

2. The combination as specified in claim 1 wherein each of the third and fourth camming members has a cylindrical surface adjacent to said interior surface of said wall of said exterior tube and concentric therewith when in contiguous relation thereto.

3. A telescopic lock including an exterior tube, an interior tube telescopically situated with respect to said exterior tube, a stud concentric with and fixedly mounted in a first end of said interior tube to have position inside said exterior tube, a first non resilient, frusto-cylindrical camming member threadably mounted on said stud inside of said exterior tube, a second non-resilient frusto-cylindrical camming member slidably situated in said exterior tube round said stud and between said first end of said interior tube and said first camming member, third and fourth identical non resilient, frusto-cylindrical camming members each situated between said stud and an inner surface of a wall of said exterior tube and between said first and second camming members, each of said four camming members being provided with a pair of flat surfaces lying in planes which intersect at a line passing inside said wall of said exterior tube, and each of said pair of surfaces of each camming member lying in sliding, adjacent, contiguous relationship to a corresponding surface of an adjacent camming member.

4. The combination as specified in claim 3 wherein said first and second camming members each have a cylindrical surface concentric with and adjacent to said interior surface of said wall of said exterior tube and wherein said third and fourth camming members each have a cylindrical surface adjacent to said interior surface of said wall of said exterior tube and concentric therewith when in contiguous relation thereto.

References Cited in the file of this patent
UNITED STATES PATENTS

| | | |
|---|---|---|
| 2,508,039 | Neuwirth | May 16, 1950 |
| 2,542,967 | Waechter | Feb. 20, 1951 |